US012304212B2

(12) United States Patent
Qiu et al.

(10) Patent No.: US 12,304,212 B2
(45) Date of Patent: May 20, 2025

(54) INK CARTRIDGE HAVING PRINT HEAD

(71) Applicant: Zhuhai Ninestar Management Co., Ltd., Guangdong (CN)

(72) Inventors: Yongqun Qiu, Guangdong (CN); Mujia Liao, Guangdong (CN); Wei Shen, Guangdong (CN)

(73) Assignee: ZHUHAI NINESTAR MANAGEMENT CO., LTD., Guangdong (CN)

( * ) Notice: Subject to any disclaimer, the term of this patent is extended or adjusted under 35 U.S.C. 154(b) by 125 days.

(21) Appl. No.: 18/001,239

(22) PCT Filed: Apr. 30, 2021

(86) PCT No.: PCT/CN2021/091594

§ 371 (c)(1),
(2) Date: Dec. 8, 2022

(87) PCT Pub. No.: WO2022/052488

PCT Pub. Date: Mar. 17, 2022

(65) Prior Publication Data

US 2023/0226822 A1 Jul. 20, 2023

(30) Foreign Application Priority Data

Sep. 11, 2020 (CN) ........................ 202021995427.7

(51) Int. Cl.
*B41J 2/175* (2006.01)

(52) U.S. Cl.
CPC ......... *B41J 2/17526* (2013.01); *B41J 2/1754* (2013.01)

(58) Field of Classification Search
CPC .. B41J 2/17526; B41J 2/1754; B41J 2/17513; B41J 2/1753; B41J 2/17546; B41J 2/1752
See application file for complete search history.

(56) References Cited

U.S. PATENT DOCUMENTS 6,238,038 B1 5/2001 Gilham et al.
6,409,326 B1 6/2002 Giles et al.
(Continued)

FOREIGN PATENT DOCUMENTS

CN 103921558 A 7/2014
EP 0999060 A2 * 5/2000
(Continued)

OTHER PUBLICATIONS

Hosaka, Ken et al., Head Holder, Head Assembly, Head Cartridge, Ink Jet Recorder, And Method For Manufacturing Head Assembly (EP 0 999 060 A2), May 10, 2000, paragraphs 0030-0056 (Year: 2000).*
(Continued)

*Primary Examiner* — Lisa Solomon
(74) *Attorney, Agent, or Firm* — McCoy Russell LLP

(57) ABSTRACT

An ink cartridge having a print head. The ink cartridge comprises an ink container, a print head housing, and a first chip; the ink container has an ink containing chamber; the ink containing chamber is used for containing ink; the print head housing has a mounting chamber; the ink container is mounted in the mounting chamber, and is used for supplying the ink to a print head mounted on the print head housing; the first chip is provided on the outer surface of the ink container, and at least part of the first chip is exposed to the outer surface of the ink cartridge; the portion of the first chip exposed to the outer surface of the ink cartridge comprises information contacts.

10 Claims, 8 Drawing Sheets

(56) References Cited

U.S. PATENT DOCUMENTS

| | | | |
|---|---|---|---|
| 8,544,988 B1 | 10/2013 | Hooker et al. |
| 2011/0310161 A1 | 12/2011 | Kimura et al. |
| 2014/0225946 A1 | 8/2014 | Quinn et al. |
| 2017/0259568 A1 | 9/2017 | Dodd et al. |

FOREIGN PATENT DOCUMENTS

| | | | |
|---|---|---|---|
| JP | H0229346 A | | 1/1990 |
| JP | H0760953 A | | 3/1995 |
| JP | H08216397 A | | 8/1996 |
| JP | H11334052 A | | 12/1999 |
| JP | 2003182070 A | | 7/2003 |
| JP | 2004358793 A | * | 12/2004 |
| JP | 2005343079 A | | 12/2005 |
| JP | 2008284884 A | | 11/2008 |
| JP | 2015093452 A | | 5/2015 |
| JP | 2016107525 A | | 6/2016 |
| JP | 2017530884 A | | 10/2017 |

OTHER PUBLICATIONS

Saikawa Takashi, Residual Quantity Detection Method for Ink Cartridge, Residual Quantity Detection System for Ink Cartridge, Ink-Jet Printer, and Ink Cartridge (JP 2004358793 A), Dec. 24, 2004, [Paragraphs 0028-0034, 0051-0055] (Year: 2004).*

ISA China National Intellectual Property Administration, International Search Report Issued in Application No. PCT/CN2021/091594, Jul. 21, 2021, WIPO, 7 pages.

Japanese Patent Office, Office Action Issued in Application No. 2022-571263, Nov. 7, 2023, 8 pages.

Japanese Patent Office, Notice of Allowance Issued in Application No. 2022-571263, Jan. 16, 2024, 6 pages.

European Patent Office, Extended European Search Report Issued in Application No. 21865549.6, Mar. 21, 2024, Germany, 8 pages.

* cited by examiner

INK CARTRIDGE HAVING PRINT HEAD

CROSS REFERENCE TO RELATED APPLICATIONS

The present application is a National Phase of International Application No. PCT/CN2021/091594, filed on Apr. 30, 2021, which claims priority to Chinese Patent Application No. 202021995427.7 filed on Sep. 11, 2020. The contents of which are incorporated herein by reference in their entireties.

TECHNICAL FIELD

The present disclosure relates to the field of imaging technologies and, in particular, to an ink cartridge having a print head.

BACKGROUND

In the related art, an ink cartridge having a print head generally includes an ink container, a print head housing and a chip. The ink container is provided in the print head housing to provide ink for the print head installed in the print head housing. The chip is provided in the ink container and the print head housing, and the chip provided in the ink container stores information such as ink quantity and model. When the chip needs to be upgraded or information stored therein needs to be rewritten, the ink container needs to be taken out from the print head housing to rewrite and upgrade the chip, making the operation complicated and inconvenient.

SUMMARY

In order to overcome the above-mentioned problems in the related art, the present disclosure mainly aims at providing an ink cartridge in which the chip can be directly upgraded or information-rewritten, so as to avoid complicated disassembly operations.

In order to achieve the above purpose, the present disclosure adopts the following technical solutions.

The present disclosure provides an ink cartridge having a print head, including: an ink container having an ink containing chamber for containing ink; a print head housing having a mounting chamber, the ink container is mounted in the mounting chamber and is configured to supply ink to a print head mounted on the print head housing; and a first chip provided at an outer surface of the ink container, at least a part of the first chip is exposed to an outer surface of the ink cartridge, and the part of the first chip exposed to the outer surface of the ink cartridge includes an information contact.

In an embodiment, the ink container includes a side surface and a top surface, the first chip further includes a first substrate, one end of the first substrate is provided at the side surface, and the other end of the first substrate extends to the top surface; and the information contact is provided at the end of the first substrate extending to the top surface.

In an embodiment, the first substrate includes a first area, a second area and a flexible connection area, the first area is provided at the side surface, the second area is provided at the top surface, and the flexible connection area is wound around a junction of the side surface and the top surface, one end of the flexible connection area is connected to the first area, the other end of the flexible connection area is connected to the second area, and the information contact is provided in the second area.

In an embodiment, the ink cartridge further includes a protective cover, and the protective cover partially encloses and is fastened to the print head housing and the ink container.

In an embodiment, the ink container includes a side surface, the first chip further includes a first substrate, the first substrate is provided at the side surface, the information contact is provided at the first substrate, the print head housing is provided with a first notch, and a position of the first notch corresponds to a position of the information contact.

In an embodiment, the first substrate includes a second area, the second area is provided at an end of the first substrate adjacent to a top surface of the ink container, and the information contact is provided in the second area.

In an embodiment, the first notch penetrates through an opening of the mounting chamber.

In an embodiment, the ink cartridge further includes a protective cover, the protective cover partially encloses and is fastened to the print head housing and the ink container, the protective cover is provided with a second notch, and a position of the second notch corresponds to the position of the first notch.

In an embodiment, the ink container includes a positioning member, the first chip further includes a first substrate, the first substrate is provided with a positioning hole, and the positioning hole is provided corresponding to the positioning member.

In an embodiment, the ink cartridge further includes a chip component, the chip component further includes a second chip and a third chip, the third chip is provided at an outer wall of the print head housing, and one end of the second chip is provided at the outer wall of the print head housing and electrically connected with the third chip, and the other end of the second chip extends to an inner wall of the mounting chamber and is electrically connected to the first chip.

Compared with the related art, the ink cartridge according to the present disclosure makes at least a part of the first chip provided at the ink container exposed to the outer surface of the ink cartridge, and the part of the first chip exposed to the outer surface of the ink cartridge includes information contacts. When the chip needs to be upgraded or information-rewritten, it is not required to take out the ink container from the print head housing, and the first chip can be upgraded or information-rewritten directly, so that complicated disassembly operations are avoided, the process is simplified, the usage of ink cartridges becomes more convenient, and the thus performance of ink cartridges is improved.

REFERENCE SIGNS

1—ink container, 10—ink containing chamber, 11—housing, 110—containing part, 111—side surface, 12—cover body, 120—top surface, 121—ink injecting hole, 122—air guiding hole, 123—air guiding groove, 13—overlay film, 14—pressing part, 15—stopper, 16—rib, 17—engaging part, 18—positioning member, 19—supporting part, 2—print head housing, 20—mounting chamber, 21—limiting groove, 22—first notch, 3—protective cover, 31—second notch, 4—chip component, 41—first chip, 411—first substrate, 411*a*—first area, 411*b*—second area, 411*c*—flexible connection area, 411*d*—positioning hole, 412—information contact, 42—second chip, 43—third chip.

The accompanying drawings, which are incorporated in and constitute a part of the specification, illustrate embodiments consistent with the present disclosure, and explain the principles of the present disclosure together with the description.

DESCRIPTION OF EMBODIMENTS

In order to better understand the purpose, technical solutions and advantages of the present disclosure, the present disclosure will be further described in detail below with reference to the accompanying drawings and embodiments. It should be understood that the specific embodiments described herein are only used to explain the present disclosure, but not to limit the present disclosure.

In the description of the present disclosure, unless additional specification and limitation, the terms “first” and “second” are only used for the purpose of description, but not construed as indicating or implying relative importance. Unless otherwise specification or illustration, the term “plurality” refers to two or more. The terms “connection” and “fixed” should be understood in a broad sense. For example, “connection” can be fixed connection, detachable connection, integrated connection, or electrical connection. Also, “connection” can be direct connection, or indirect connection through an intermediate medium. For those skilled in the art, the specific meanings of the above terms in the present disclosure can be understood according to specific situations.

In the illustration of the description, it should be understood that the directional words such as “top” and “bottom” described in the embodiments of the present disclosure are described from the perspective shown in the accompanying drawings, but should not be construed as limitations to the embodiments of the present disclosure. In addition, it should also be understood that when it is referred that an element is connected “above” or “under” another element in the contexts, the element can not only be directly connected “above” or “under” the other element, but also be indirectly connected “above” or “under” the other element through an intermediate element.

Figure 1:
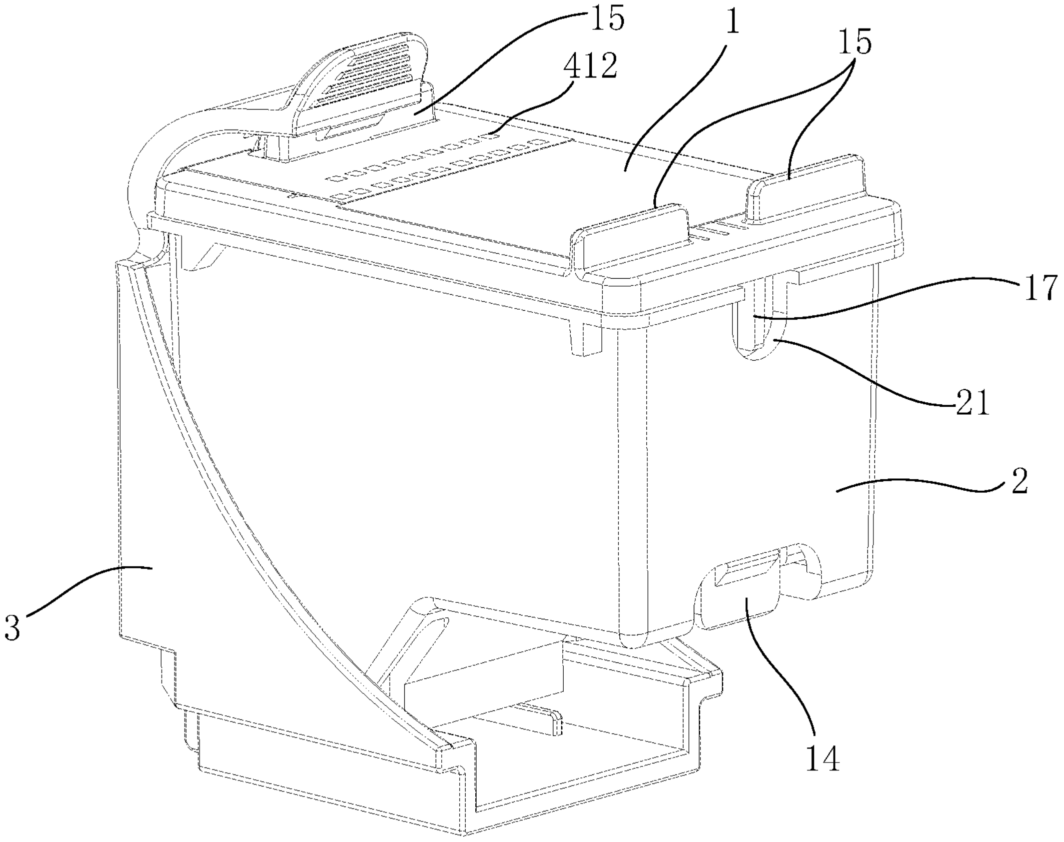
FIG. 1 is a perspective view of an ink cartridge according to an embodiment of the present disclosure.
Figure 2:
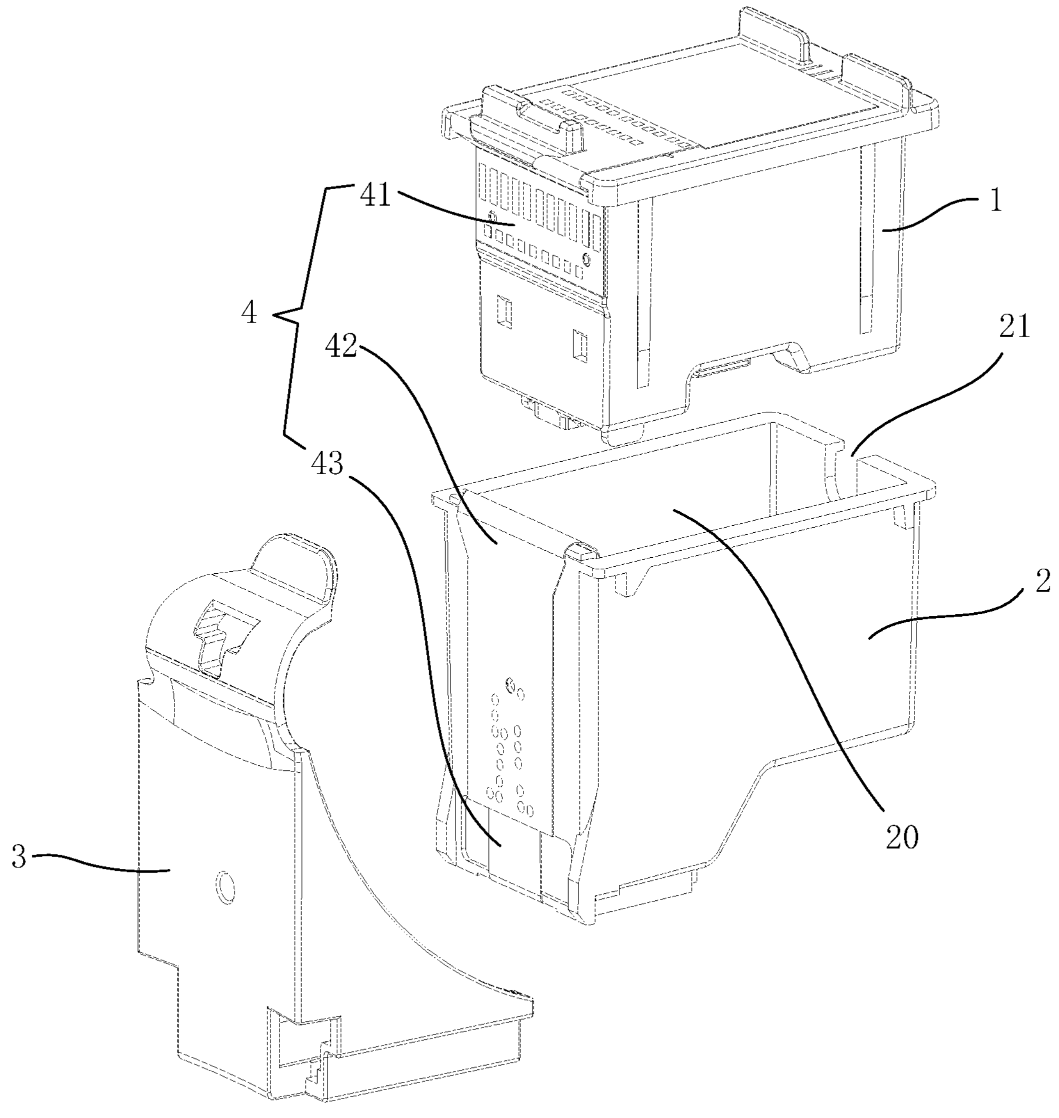
FIG. 2 is an exploded perspective view of an ink cartridge according to an embodiment of the present disclosure.

As shown in FIGS. 1 and 2, an embodiment of the present disclosure discloses an ink cartridge having a print head, the ink cartridge includes an ink container 1, a print head housing 2, a protective cover 3, a chip component 4 and a print head (not shown in the figures). The print head is provided at the bottom of the print head housing 2 for printing jobs. The print head housing 2 includes a mounting chamber 20. The ink container 1 is detachably installed in the mounting chamber 20. The ink container 1 has an ink containing chamber 10, and the ink containing chamber 10 is configured to contain ink, so as to provide ink for the print head through the ink container 1. The ink container 1 can be taken out from the print head housing 2 for replacement when the ink in the ink container 1 is exhausted. The protective cover 3 partially encloses and is fastened to the print head housing 2 and the ink container 1 to protect the print head housing 2 and the ink container 1. The chip component 4 includes a first chip 41. The first chip 41 is provided at the outer surface of the ink container 1, and at least a part the first chip 41 is exposed to the outer surface of the ink cartridge. The part of the first chip 41 exposed to the outer surface of the ink cartridge includes an information contact 412, and the information contact 412 is configured for rewriting, upgrading or recording information.

In the present disclosure, by exposing a part of the information contact 412 to the outer surface of the ink cartridge, when the first chip 41 needs to be upgraded or information-rewritten, it is not required to disassemble the protective cover 3 or take out the ink container 1 from the print head housing 2, and the first chip 41 of the ink container 1 can be directly upgraded or information-rewritten, so that the performance of the ink cartridge is improved.

In an embodiment, the chip component 4 further includes a second chip 42 and a third chip 43. The third chip 43 is provided at the outer wall of the print head housing 2, and configured to contact with the printing device to realize electrical connection. One end of the second chip 42 is provided at the outer wall of the print head housing 2 and electrically connected to the third chip 43, and the other end of the second chip 42 extends to the inner wall of the mounting chamber 20 and is electrically connected to the first chip 41.

Figure 3:
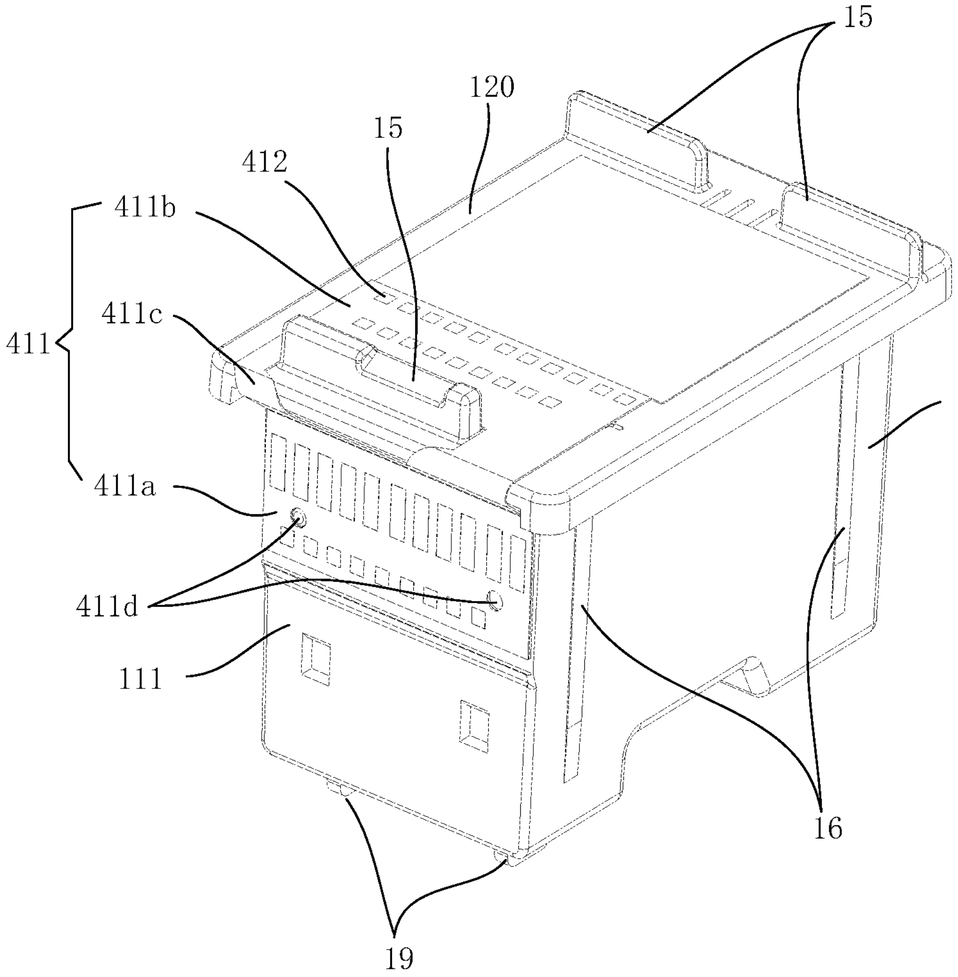
FIG. 3 is a perspective view of the ink container in FIG. 1.

As shown in FIG. 3, the ink container 1 includes a side surface 111 and a top surface 120, the first chip 41 further includes a first substrate 411, one end of the first substrate 411 is provided at the side surface 111, and the other end of the first substrate 411 extends to the top surface 120. The information contact 412 is provided at the end of the first substrate 411 extending to the top surface 120.

In an embodiment, the first substrate 411 includes a first area 411*a*, a second area 411*b* and a flexible connection area 411*c*. The first area 411*a* is provided at the side surface 111 to be electrically connected with the second chip 42. The second area 411*b* is provided at the top surface 120. The information contact 412 is provided at the second area 411*b*. The flexible connection area 411*c* is wound around the junction of the side surface 111 and the top surface 120. One end of the flexible connection area 411*c* is electrically connected to the first area 411*a*, and the other end of the flexible connection area 411*c* is electrically connected to the second area 411*b*.

Figure 4:
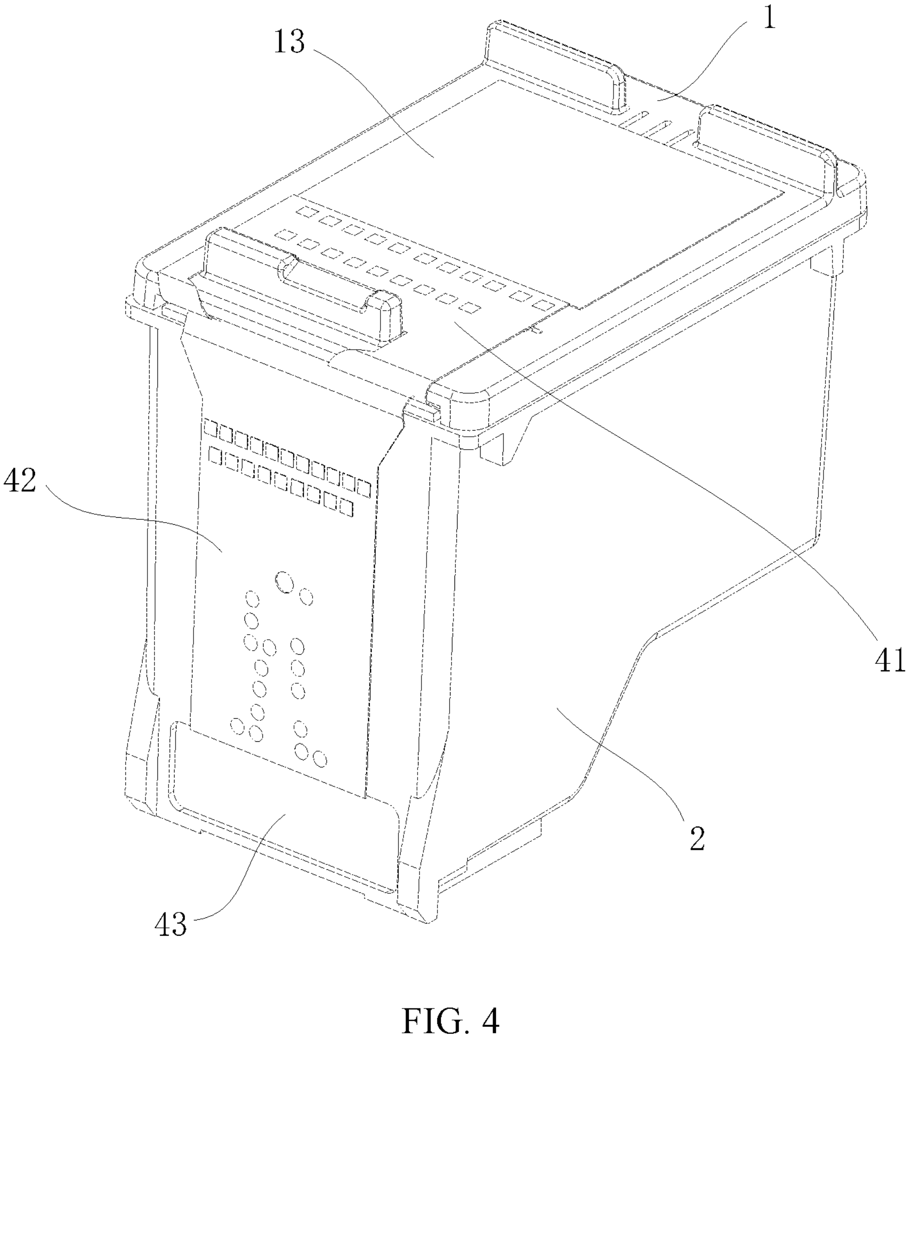
FIG. 4 is an exploded perspective view of the ink container in FIG. 1.

As shown in FIG. 4, the third chip 43 includes a third substrate, a plurality of electrical contacts and conductive contacts (not shown in the figure). The third substrate is provided at the outer wall of the print head housing 2. The plurality of electrical contacts and conductive contacts are respectively provided at the outer side of the third substrate. The plurality of electrical contacts are configured to connect with corresponding contacts at the printer side, so as to establish an electrical connection between the third chip and the printer. The second chip 42 includes a second substrate. The second substrate includes a first area and a second area.

A contact part is provided at the side of the first area of the second substrate facing the third chip 43. The first area of the second chip 42 can be attached to the outer side of the third chip 43, so that the contact part of the second chip 42 one-to-one corresponds to the conductive contacts of the third chip 43, so as to achieve electrical connection. The second area of the second chip 42 bypasses the edge of the opening of the mounting chamber 20 and extends to the inner wall of the mounting chamber 20, and is in contact with the first area 411*a* of the first chip 41 to realize electrical connection.

In this embodiment, the first area 411*a* of the first chip 41 is made of a rigid plate which can enhance the strength of the first chip 41 and make it easier to fix the first chip 41 on the ink container 1. The second area 411*b* and the flexible connection area 411*c* of the first chip 41 are both made of flexible plates which are bent over the stopper on the ink container 1 and fixed at the top surface of the ink container 1. Therefore, after the ink container 1 is installed in the print head housing 2 and the protective cover 3 is installed, the information contact 412 of the second area 411*b* of the first chip 41 can still be exposed to the outer surface of the ink cartridge, so as to facilitate operations of information-rewriting and upgrading.

It can be understood that, in other embodiments, it is possible that the flexible connection area 411*c* is made of a flexible plate, and both the first area 411*a* and the second area 411*b* are made of rigid plates.

As shown in FIGS. 1 and 4, the ink container 1 includes a housing 11, a cover body 12, a pressing part 14, a stopper 15, a rib 16 and an engaging part 17. The ink containing chamber 10 is opened at the housing 11. The housing 11 includes a side surface 111. The side surface 111 includes a containing part 110. The containing part 110 is configured to contain a wafer integration part provided at the back surface of the first area 411*a* of the first substrate 411. The pressing part 14 and the engaging part 17 are respectively connected to the side walls of the housing 11. The print head housing 2 is provided with a limiting groove 21. The limiting groove 21 is in cooperation with the engaging part 17, so that the ink container 1 can be engaged and fixed with the print head housing 2 through the engaging part 17 and the limiting groove 21. The stopper 15 is connected to the upper surface of the cover body 12 and configured to be engaged with the printer body, so that the ink cartridge is installed and fixed in the printer body. The rib 16 is provided at both sides of the housing 11 and configured to increase friction, engage, snap or cooperate with the inner wall of the print head housing 2, so as to enhance the stability of the fixation of the ink container 1 in the print head housing 2. The cover body 12 is connected to the housing 11 by welding, so that the cover body 12 can cover the ink containing chamber 10.

In some embodiments, the number of the stopper 15 may be one or more. For example, three stoppers 15 are provided, two of which are provided at the same end of the top of the cover body 12 and symmetrically about the axis of the cover body 12, and the other one of which is provided at the other end of the top of the cover body 12 and the center line thereof is collinear with the axis of the cover body 12. The imaging device is provided with slots corresponding to each stopper 15, respectively. When the ink cartridge is installed into the body of the imaging device, each stopper 15 extends into a corresponding slot on the body of the imaging device to be engaged. It can be understood that, in other embodiments, one, two or more than three stoppers 15 can be provided, and the specific providing position can also be set according to actual requirements. In that circumstances, the stopper located at the other end of the top of the cover body 12 may also have the function of fixing the protective cover.

Further, the cover body 12 is provided with an ink injecting hole 121, an air guiding hole 122 and an air guiding groove 123. The ink injecting hole 121 is communicated with the ink containing chamber 10. The ink can be injected into the ink containing chamber 10 through the ink injecting hole 121, so that the operation is simple and convenient. The air guiding hole 122 is communicated with the ink containing chamber 10, so as to balance the air pressure between the ink containing chamber 10 and the external environment, so that the ink can flow out smoothly. At the same time, by leading out the air in the ink containing chamber 10, the ink in the ink containing chamber 10 is prevented from drying out due to the evaporation. Alternatively, the air guiding hole 122 may be circular or square, as long as air communication can be achieved. One end of the air guiding groove 123 is connected to the air guiding hole 122, and the other end of the air guiding groove 123 is provided with an opening that communicates with the outside. The numbers of ink injecting holes 121 and air guiding holes 122 are related to the type of ink cartridge.

In order to prevent the outside air from entering through the air guiding hole 122, causing the ink inside the ink containing chamber 10 to evaporate and get dried, and also to prevent the ink from flowing out through the air guiding hole 122 and the ink injecting hole 121, the ink container 1 further includes an overlay film 13. The overlay film 13 is overlaid over the air guiding groove 123, the air guiding hole 122 and the ink injecting hole 121. In some embodiments, the overlay film 13 may be an aluminum plate or a plastic film. For example, the overlay film 13 is made of a transparent PVC material, and the ink in the ink containing chamber 10 can be observed through the air guiding hole 122. When there is air inside the ink containing chamber 10, since the density of the air is lower than the ink, the air is above the ink containing chamber 10, flows into the air guiding hole 122, then enters one port of the air guiding groove 123, flows along the air guiding groove 123, reaches the other port of air guiding groove 123, and finally flow out from the opening and into the external air.

In this embodiment, since the overlay film 13 covers the air guiding hole 122, the air guiding hole 122 cannot be used to balance the air pressure between the ink containing chamber 10 and the external environment, so that a pressure difference exists between the ink containing chamber 10 and the outside, which may cause the ink injection difficult. Therefore, the other port of the air guiding groove 123 is provided with an opening. The opening is communicated to the external air, and is configured to balance the air pressure between the ink containing chamber 10 and the external environment, making the ink injection easy and smooth. The air guiding groove 123 may be a straight pipe segment, and is configured to exhaust the air inside the ink containing chamber 10. In an embodiment, the air guiding groove 123 bends and extends at the cover body 12, and forms a tortuous curve, so as to prevent the ink from flowing out along the air guiding hole 122 and the air guiding groove 123.

In this embodiment, the second area 411*b* of the first chip 41 is fixed on one end of the cover body 12, and thereby can also cover a part of the air guiding hole 122, the air guiding groove 123 and the ink injecting hole 121. In an embodiment, in order to optimize the sealing quality, the overlay film 13 is used to cover the air guiding hole 122, the guiding groove 123 and the injecting hole 121 throughout the cover body 12, and then the second area 411*b* of the first chip 41 is welded or pasted to the overlay film 13, the fixation means is not limited herein.

In this embodiment, the interior of the ink containing chamber 10 is divided into three compartments by partition plates, which store the ink of three colors C, M, and Y, respectively. Sponge or other porous materials can be arranged in the three storage chambers, and is used to absorb and store ink. The upper openings of the three storage chambers correspond to the air guiding hole 122, the air guiding groove 123 and the ink injecting hole 121, respectively. The corresponding air guiding groove 123 extends to the rear end of the cover body 12 through a tortuous maze channel and aggregates therein. When only the ink of BK color is stored in the ink container 1, the number and layout of the air guiding holes 122, the air guiding groove 123 and the ink injecting holes 121 on the corresponding cover body 12 will also be changed accordingly, which will not be described here.

Since the ink container 1 is often placed on the table when replacing the ink container 1, the dust on the table will easily enter the ink container 1 from the ink outlet (located at the bottom, not shown) of the ink container 1 and lead to contaminating the ink in the ink container 1. In order to prevent the ink in the ink container 1 from being contaminated, the ink container 1 further includes a supporting part 19. The supporting part 19 is provided at one side of the bottom of the housing 11, and the length of the supporting part 19 protruding from the bottom of the housing 11 is greater than the ink outlet protruding from the bottom of the housing. Through the setting of the supporting part 19, the ink outlet of the ink container 1 can be prevented from directly contacting the outside, and dust can be prevented from entering the ink outlet.

Figure 5:
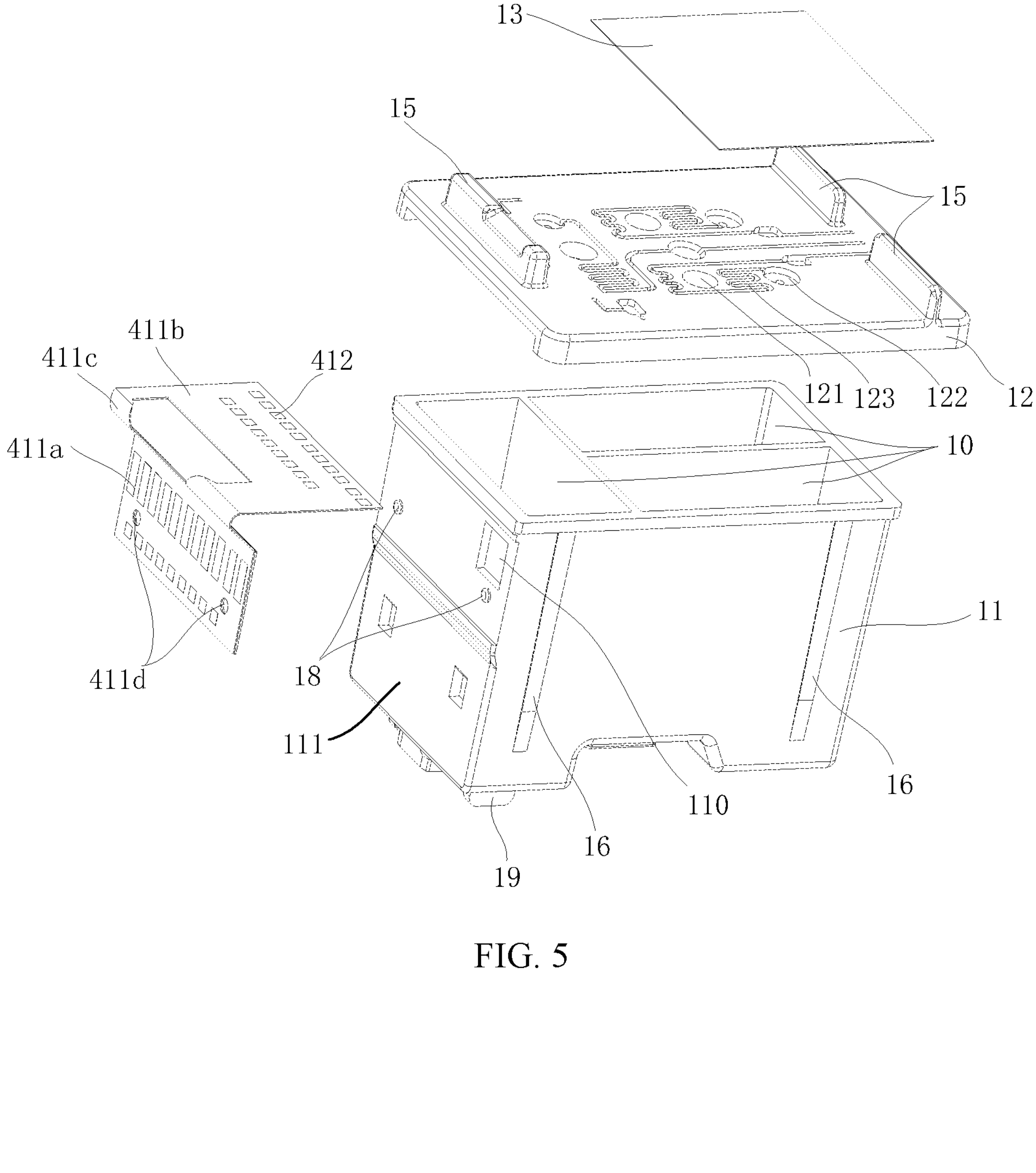
FIG. 5 is an assembly perspective view of the ink container and the print head housing in FIG. 1.

As shown in FIG. 5, the ink container 1 further includes a positioning member 18. The positioning member 18 is connected to the side surface 111 of the housing 11. The first substrate 411 is provided with a positioning hole 411*d*. The position of the positioning hole 411*d* corresponds to the position of the positioning member 18. When the first chip 41 is connected to the ink container 1, guidance is realized by the positioning hole 411*d* and the positioning member 18, so that the first chip 41 can be connected to the ink container 1 more smoothly. Further, the first area 411*a* of the first chip 41 can be fixed to the surface of the ink container 1 by a process such as welding or pasting. Alternatively, the ends of the positioning member 18 can be softened by heating, so that the ends of the positioning member 18 can bend to cover at least a part of the first substrate 411. As the positioning member 18 is cooled and solidified, the positioning member 18 can cover the surface of the first substrate 411 like a flange to fix the first area 411*a* of the first substrate 411.

Figure 6:
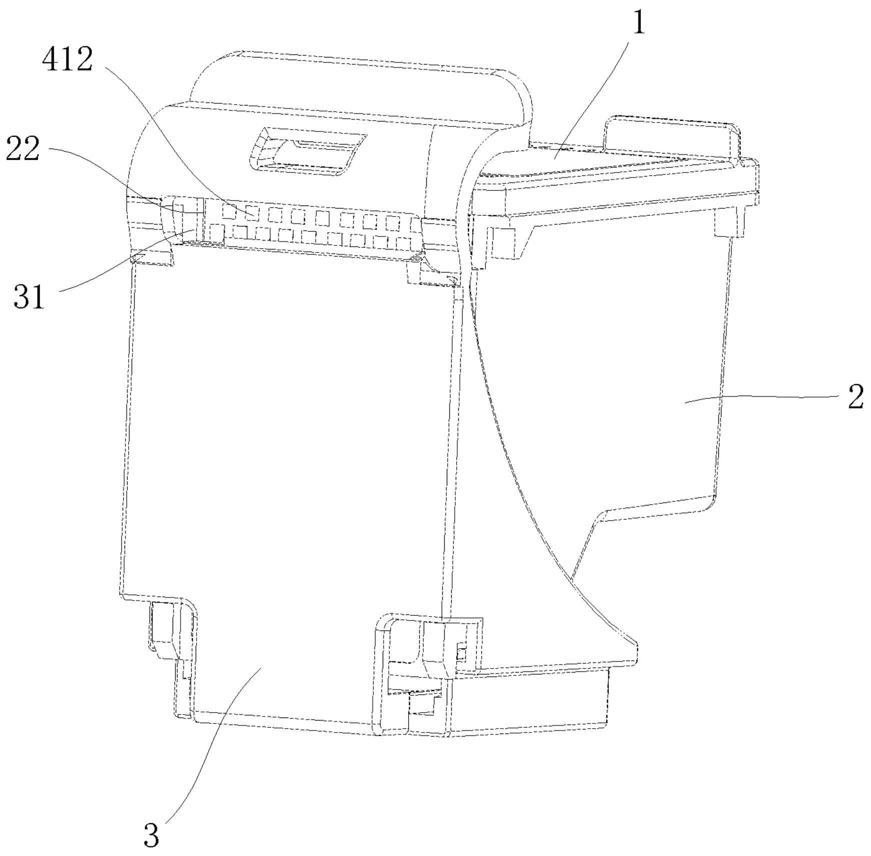
FIG. 6 is an assembly perspective view of an ink cartridge according to another embodiment of the present disclosure.
Figure 7:
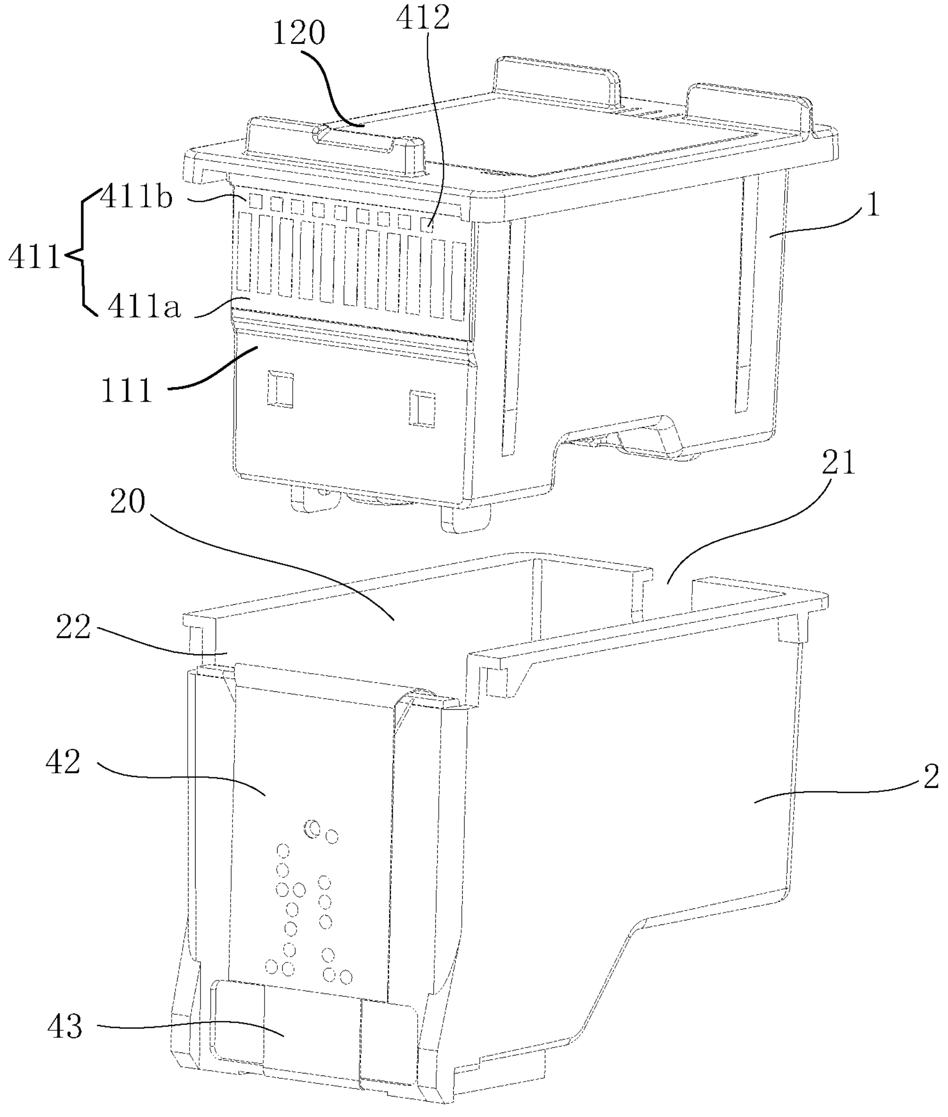
FIG. 7 is an exploded perspective view of the ink container and the print head housing in FIG. 6.
Figure 8:
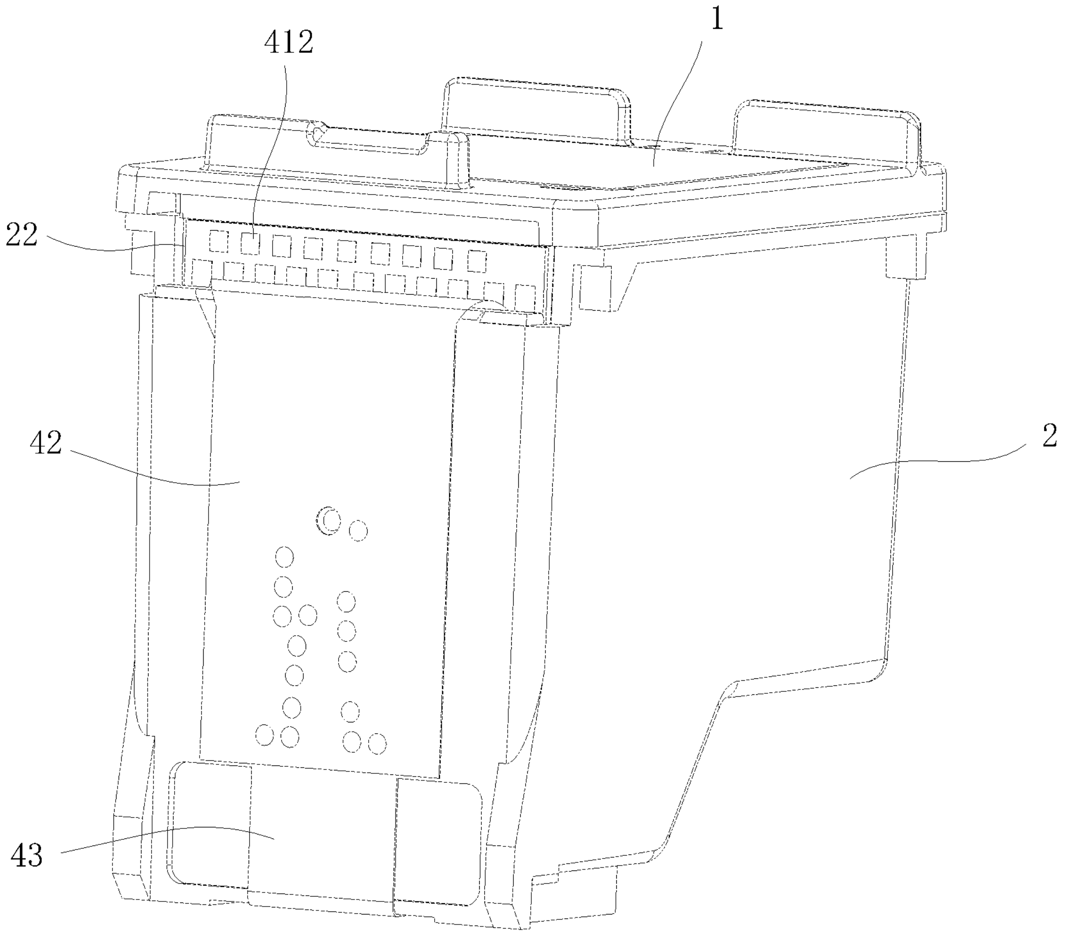
FIG. 8 is an assembly perspective view of the ink container and the print head housing in FIG. 6.

On the basis of the above-mentioned embodiments, the present disclosure further provides another embodiment. As shown in FIGS. 6 to 8, this embodiment differs from the above-mentioned embodiments in that, the first substrate 411 is only provided at the side surface 111 of the ink container 1, and does not extend to the top surface 120 of the ink container 1. The information contact 412 is provided at the first substrate 411, that is, the information contact 412 is only located at the side surface 111 of the ink container 1. The print head housing 2 is provided with a first notch 22. The position of the first notch 22 corresponds to the position of the information contact 412. The protective cover 3 is provided with a second notch 31. The position of the second notch 31 corresponds to the position of the first notch 22, so that the information contact 412 is exposed to the outer surface of the ink cartridge. When the first chip 41 needs to be upgraded or information-rewritten, the first chip 41 can be directly upgraded or information rewritten through the second notch 31 and the first notch 22.

The first substrate 411 includes a first area 411*a* and a second area 411*b* electrically connected to the first area 411*a*. The first area 411*a* is configured to contact with the second chip 42 to realize electrical connection. The second area 411*b* is exposed to the outer surface of the ink cartridge. The information contact 412 is provided at the second area 411*b* to facilitate operations such as information-rewriting or upgrading.

Further, the second area 411*b* is located at the end of the first substrate 411 adjacent to the top surface 120 of the ink cartridge. The first notch 22 penetrates through the opening of the mounting chamber 20. One end of the second chip 42 is provided at the outer wall of the housing 11, and the other end of the second chip 42 bypasses the first notch 22 and extends to the inner wall of the mounting chamber 20 and contacts with the first area 411*a* to realize electrical connection.

In this embodiment, the structure of the first chip is simplified, so that the first chip does not need to be additionally provided with an area wound around the top surface, so that the process is simplified, and the cost of the first chip is reduced. It is only necessary to add a row of contacts on the substrate of the first chip, and provide corresponding notches on the print head housing and the protective cover to simplify the operation process of chip-rewriting or upgrading.

The above descriptions are only preferred specific embodiments of the present disclosure, but not limitation to the protection scope of the present disclosure. Any change or substitution which can be easily envisaged by those skilled in the art within the technical scope disclosed in the present disclosure should be covered within the scope of protection of the present disclosure. Therefore, the protection scope of the present disclosure should be subject to the protection scope of the claims.

The invention claimed is:

1. An ink cartridge having a print head, comprising:

an ink container having an ink containing chamber for containing ink;

a print head housing having a mounting chamber, wherein the ink container is mounted in the mounting chamber and is configured to supply ink to a print head mounted on the print head housing; and a first chip provided at an outer surface of the ink container, wherein at least a part of the first chip is exposed to an outer surface of the ink cartridge, and the part of the first chip exposed to the outer surface of the ink cartridge comprises an information contact, and the information contact is configured for rewriting, upgrading, or recording information;

wherein the ink container comprises a top surface, the first chip further comprises a first substrate, one end of the first substrate extends to the top surface, and the information contact is provided at the end of the first substrate extending to the top surface.

2. The ink cartridge according to claim 1, wherein the ink container comprises a side surface, and the other end of the first substrate is provided at the side surface.

3. The ink cartridge according to claim 2, wherein the first substrate comprises a first area, a second area and a flexible connection area, the first area is provided at the side surface, the second area is provided at the top surface, and the flexible connection area is wound around a junction of the side surface and the top surface, one end of the flexible connection area is connected to the first area, the other end of the flexible connection area is connected to the second area, and the information contact is provided in the second area.

4. The ink cartridge according to claim 1, wherein the ink cartridge further comprises a protective cover, and the protective cover partially encloses and is fastened to the print head housing and the ink container.

5. An ink cartridge having a print head, comprising:

an ink container having an ink containing chamber for containing ink;

a print head housing having a mounting chamber, wherein the ink container is mounted in the mounting chamber and is configured to supply ink to a print head mounted on the print head housing; and a first chip provided at an outer surface of the ink container, wherein at least a part of the first chip is exposed to an outer surface of the ink cartridge;

wherein the ink container comprises a side surface, the first chip further comprises a first substrate, the first substrate is provided at the side surface, the information contact is provided at the first substrate, the print head housing is provided with a first notch, and a position of the first notch corresponds to a position of the information contact.

6. The ink cartridge according to claim 5, wherein the first substrate comprises a second area, the second area is provided at an end of the first substrate adjacent to a top surface of the ink container, and the information contact is provided in the second area.

7. The ink cartridge according to claim 5, wherein the first notch penetrates through an opening of the mounting chamber.

8. The ink cartridge according to claim 5, wherein the ink cartridge further comprises a protective cover, the protective cover partially encloses and is fastened to the print head housing and the ink container, the protective cover is provided with a second notch, and a position of the second notch corresponds to the position of the first notch.

9. The ink cartridge according to claim 1, wherein the ink container comprises a positioning member, the first chip further comprises a first substrate, the first substrate is provided with a positioning hole, and the positioning hole is provided corresponding to the positioning member.

10. The ink cartridge according to claim 1, wherein the ink cartridge further comprises a chip component, the chip component further comprises a second chip and a third chip, the third chip is provided at an outer wall of the print head housing, and one end of the second chip is provided at the outer wall of the print head housing and electrically connected with the third chip, and the other end of the second chip extends to an inner wall of the mounting chamber and is electrically connected to the first chip.

* * * * *